US007516836B2

(12) United States Patent
Trygar et al.

(10) Patent No.: US 7,516,836 B2
(45) Date of Patent: Apr. 14, 2009

(54) CENTRIFUGAL FILLING APPARATUS AND METHOD

(75) Inventors: Joseph A. Trygar, Pleasant Prairie, WI (US); Jerral Richardson, Waukegan, IL (US)

(73) Assignee: Arc:One Systems, LLC, Owings Mills, MD (US)

( * ) Notice: Subject to any disclaimer, the term of this patent is extended or adjusted under 35 U.S.C. 154(b) by 234 days.

(21) Appl. No.: 11/138,515

(22) Filed: May 26, 2005
(Under 37 CFR 1.47)

(65) Prior Publication Data
US 2006/0006048 A1 Jan. 12, 2006

Related U.S. Application Data

(60) Provisional application No. 60/574,621, filed on May 26, 2004.

(51) Int. Cl.
*B23Q 7/00* (2006.01)
(52) U.S. Cl. .................... 198/392; 221/167; 221/169
(58) Field of Classification Search ................ 198/392, 198/393, 397.01–397.03; 221/167, 169, 221/172, 252, 265, 277
See application file for complete search history.

(56) References Cited

U.S. PATENT DOCUMENTS

| 2,273,782 | A | * | 2/1942 | Irwin | 221/169 |
| 3,722,740 | A | * | 3/1973 | List | 221/7 |
| 3,791,553 | A | * | 2/1974 | Aidlin et al. | 221/156 |
| 3,986,636 | A | * | 10/1976 | Hoppmann et al. | 221/7 |
| 4,825,995 | A | * | 5/1989 | Nalbach | 198/380 |
| 5,415,322 | A | * | 5/1995 | Sala | 221/169 |
| 6,065,587 | A | * | 5/2000 | Schindel | 198/465.1 |
| 7,134,540 | B1 | * | 11/2006 | Marti Sala | 198/392 |
| 2004/0149769 | A1 | * | 8/2004 | Gamberini | 221/167 |

\* cited by examiner

*Primary Examiner*—Mark A. Deuble
(74) *Attorney, Agent, or Firm*—Joseph S. Heino; Patrick M. Bergin

(57) ABSTRACT

A method and apparatus for singulating individual product items, such as pills, in unit-dose or multi-dose dispersing packaging that utilizes a pill-filling mechanism for reducing a large amount of bulk pills to a single-file stream of pills; a pill separation mechanism for singulating a variety of different sized and shaped pills; and a mechanism for delivering pills to a package, such as a blister-pack. Bar-code scanning and identification software may also be implemented to adjust the mechanisms to adapt the apparatus to different pills as they are presented to the apparatus.

11 Claims, 20 Drawing Sheets

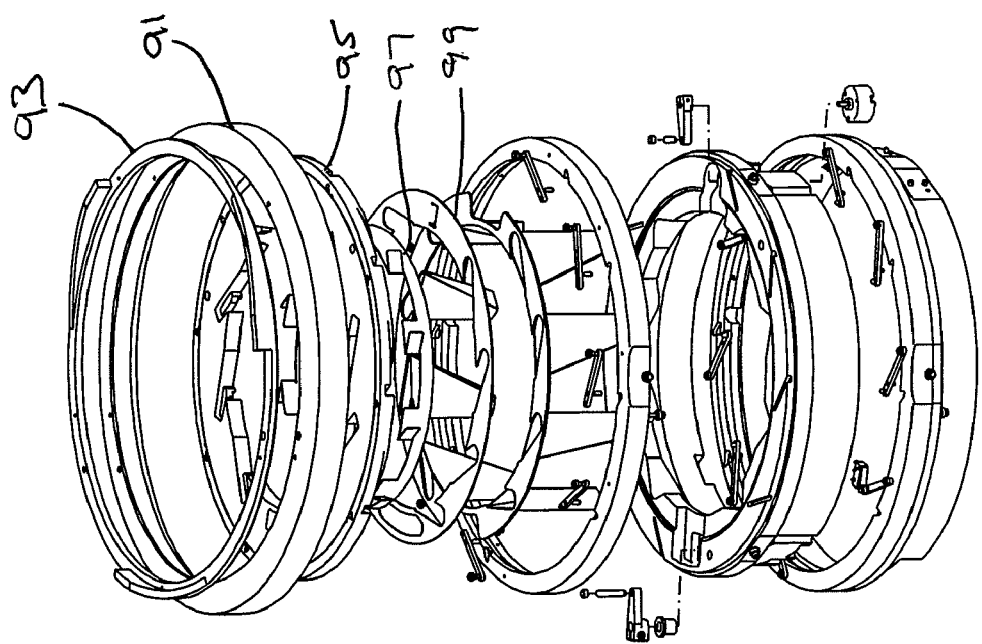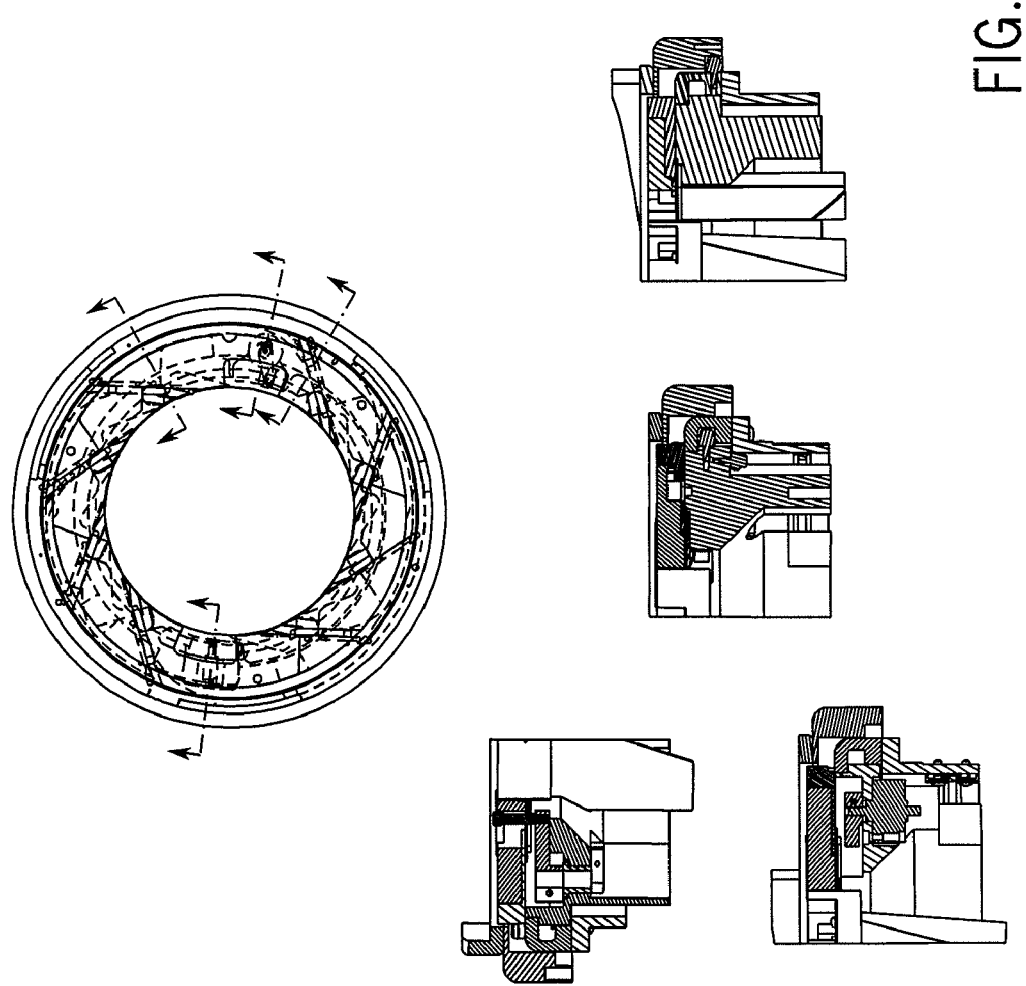
FIG. 17

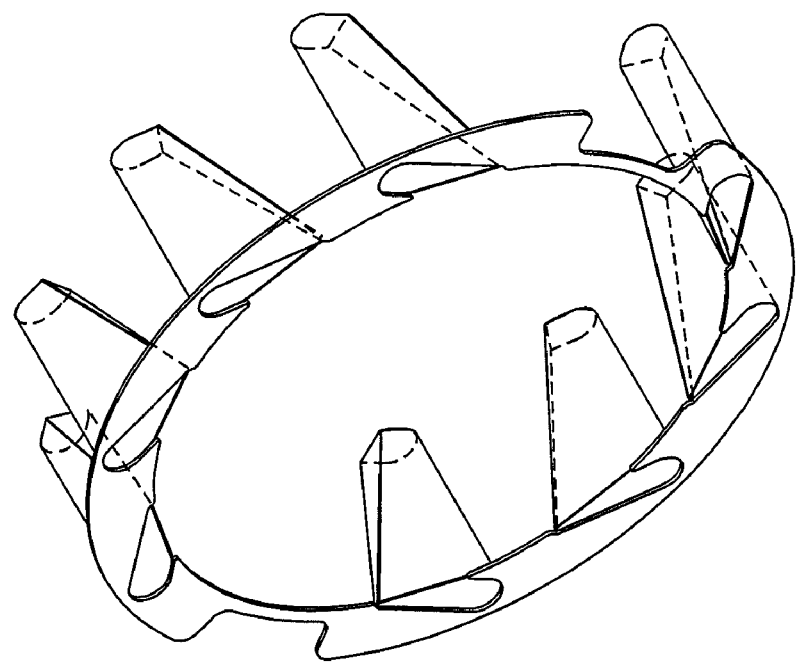
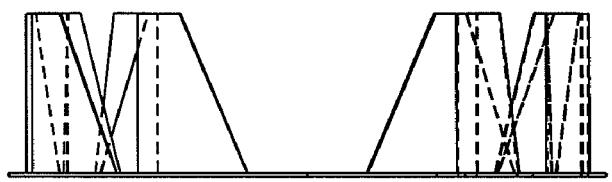
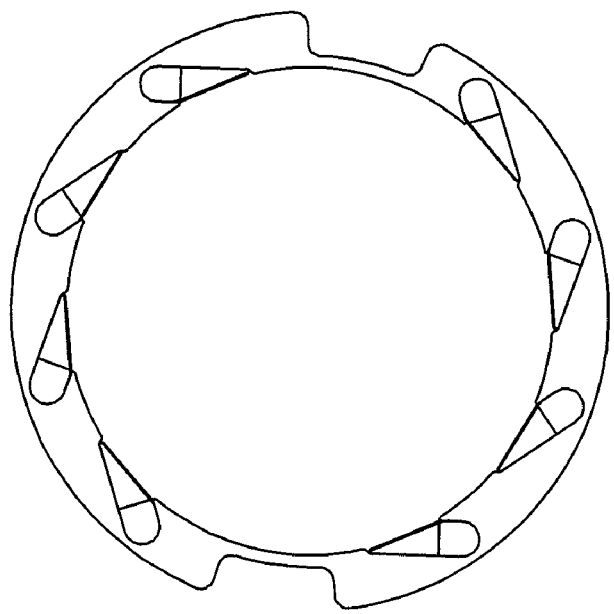
FIG. 21

CENTRIFUGAL FILLING APPARATUS AND METHOD

This application claims the benefit of U.S. Provision Application No. 60/574,621, filed May 26, 2004.

FIELD OF THE INVENTION

The present invention relates generally to methods and apparatus for handling individual product items and articles. More particularly, it relates to a method and apparatus for singulating individual product items in unit-dose or multi-dose dispensing applications for medication and/or for non-medication product item delivery.

BACKGROUND OF THE INVENTION

Frequently, small product items, and in particular pharmaceuticals such as pills, tablets, capsule, nutriceuticles (vitamins) and lozenges are packaged in blister packs where each pocket of the package holds a single pill. For ease of reference, any of the above and other small items or objects that may be required to be singulated will be referred to, collectively and generically, as "pills." Blister packs are made by forming a thermoplastic strip formed as an array of upwardly open pockets. A filling machine then puts a single pill into each pocket and a backing to the array of pockets is provided thereby sealing each pill in a pocket separate and apart from other pills within the pack.

In order to make sure that each blister package is marketable, each of the blister pack pockets must contain a single pill or the package is marked as a reject and culled from the product line. The field of pill-dispensing features many different mechanisms that are designed to recognize, sort and count tablets and capsules of all types and sizes. Many of these devices are unreliable for two basic reasons. Either they fail to singulate pills appropriately and multiple pills are placed into a single blister pack pocket or they fail to get a pill into the blister pack, leaving the entire pack one pill or more short. Such a failure is expensive when the product itself is expensive or difficult to dispose of, as is the case with many pharmaceuticals. The problem associated with separating pills from each other for individual packaging, or singulation, is exacerbated by the wide variety of different sizes, shapes and weights of different types of pharmaceuticals.

In order for one apparatus to properly recognize and singulate differently-sized pills, for instance, it has often been necessary to modify the design of the dispenser machine so as to accommodate pills of particular shapes and sizes. Additionally, frequent adjustments must be made to a dispenser machine during the operation thereof. Such changes greatly inhibit the use of such devices in facilities that are automated or are continuously run.

SUMMARY OF THE INVENTION

In view of the above-described problems, the present invention discloses a new method and apparatus that is both reliable and able to handle a wide variety of different sizes and shapes of pills without requiring adjustments to or modification of its basic design. Additionally, the current invention comprises a standardized module that can be easily loaded from a hopper that can feed pills of varying sizes and shapes. In this manner, a single workstation can sort and dispense a wide variety of pills as needed in almost any sort of prescription filling facility. Additionally, this invention is more cost-effective, faster and more versatile than existing dispensers.

The method and apparatus of the present invention provides for a centrifugal pill separator comprised of three major subsystems, a pill filling mechanism capable of reducing a large amount of bulk pills to a single file stream of pills; a pill separation apparatus capable of singulating a wide variety of differently sized and shaped pills; and a delivery means for placing singulated pills into a blister pack. The centrifugal pill dispenser may also include bar code scanning and identification software such that the pill dispenser can be automatically adjustable so as to quickly adapt to a wide variety of pills as the pills are presented to the apparatus.

The centrifugal pill dispenser of the present invention may also provide for a filling mechanism consisting of a hopper to store pills and a dispenser to control the flow of pills to the pill separation mechanism. The present invention further provides for a self-regulating filling mechanism such that when the pill level in the pill dispenser rises above a certain height, the continued flow of pills is stopped. Additionally, the present invention may provide for a pill delivery means having either a single aperture or a plurality of apertures for permitting pills to exit onto the centrifugal separator; said apertures opening and closing in response to the pills present on the centrifugal separator. The present invention may also provide for the apertures having the ability to provide a variably sized aperture for differently sized pills.

In the case of some pill types, continuous pill flow is hampered by pill size or shape. In such situations, the present invention provides for agitation of the pills within the filling mechanism to prevent potential slowdowns in the dispensing and packaging process. One potential agitation means includes the use of rotating vanes.

The present invention also provides for the use of a centrifugal pill separation mechanism consisting of a rotating disk having a plurality of concentric rings surrounding it. The rings contain channels which permit the passage of individual pills there through. In one embodiment, there are eleven channels, although either more or fewer channels are possible. The eleven channels permit the simultaneous capture and singulation of eleven pills.

The present invention also provides for a pill distribution and dispensing method and apparatus designed to fill a blister pack. The present invention will reduce or eliminate incidents of multiple pills in a single packet of a blister pack as well as the chance of empty pockets in a blister pack, thus reducing costly and difficult to dispose of pharmaceutical waste.

The present invention also provides for the use of bar code technology to adapt the pill dispensing apparatus to a broad variety of pills. Initially, the present invention provides for the creation of and use of a database including information as to the physical dimensions of individual pills. Each type of pill would then be assigned a unique, machine readable code or drug related NDC code that could be easily scanned by an optical instrument, the machine readable code being displayed prominently on containers containing pills. A microprocessor in the pill dispensing mechanism would then provide for changing the settings on the centrifugal pill dispenser to accommodate a particular pill. For example, the rotational speed of the disk may be changed, as could the depth of entry of the pills, the alignment of certain types of pills and the amount of pills to be singulated.

In summary, the method and apparatus of the present invention provides a basic design that is capable of singulating a complete range of pill sizes and shapes, without requiring different mechanical operations or adjustments. While some objects of the invention have been discussed above, other objects and advantages of this invention will become apparent from the following detailed description in conjunction in the drawings, which set forth certain embodiments of the present invention.

BRIEF DESCRIPTION OF THE DRAWINGS

FIG. 17 is a top and side exploded view of another embodiment of the pill dispensing machine.

FIG. 21 is a top, side and bottom view of the chute ring employed in the present invention.

DETAILED DESCRIPTION

Figure 1:
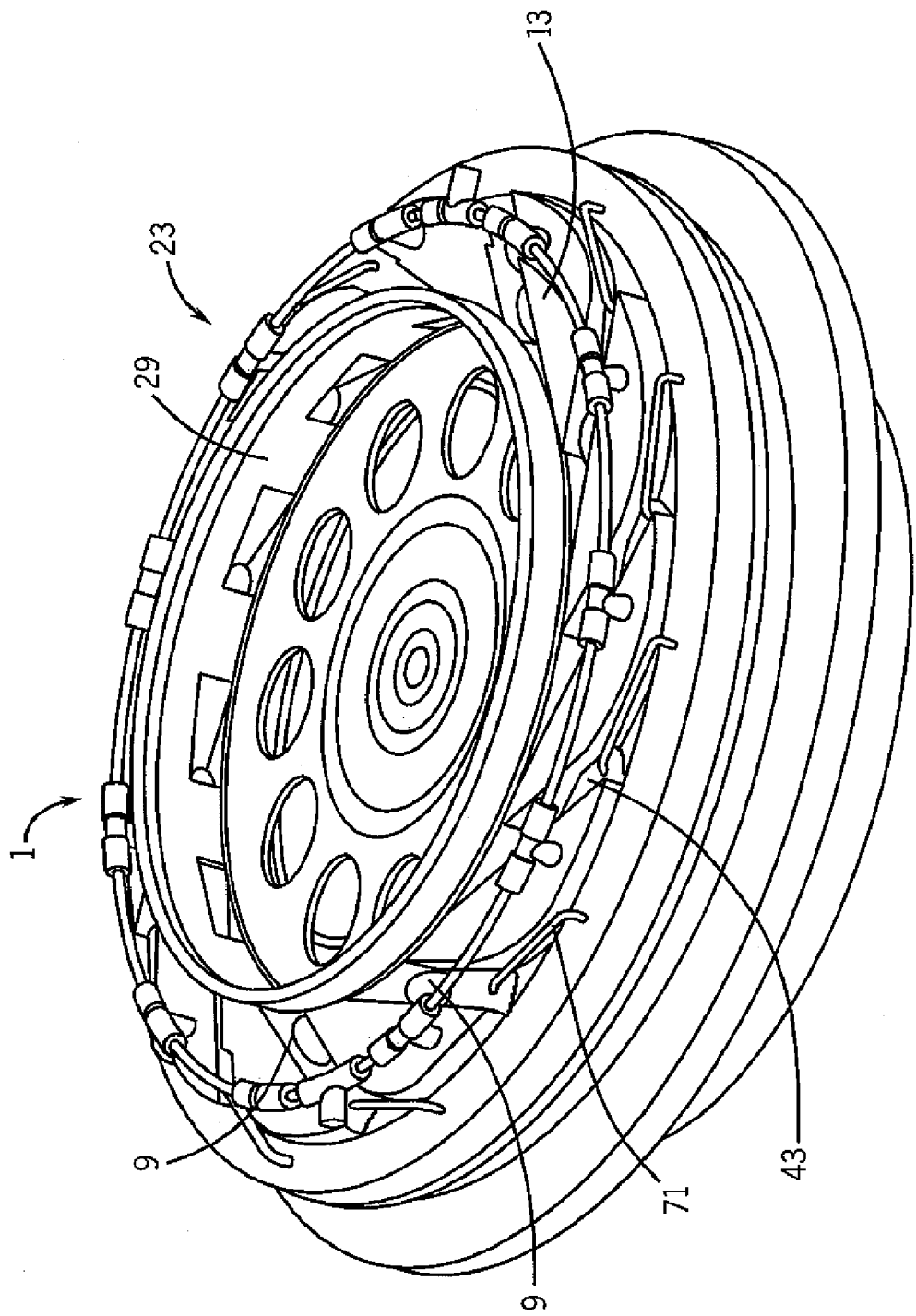
FIG. 1 is a top and side perspective view of the pill separation subsystem of the pill dispenser.
Figure 2:
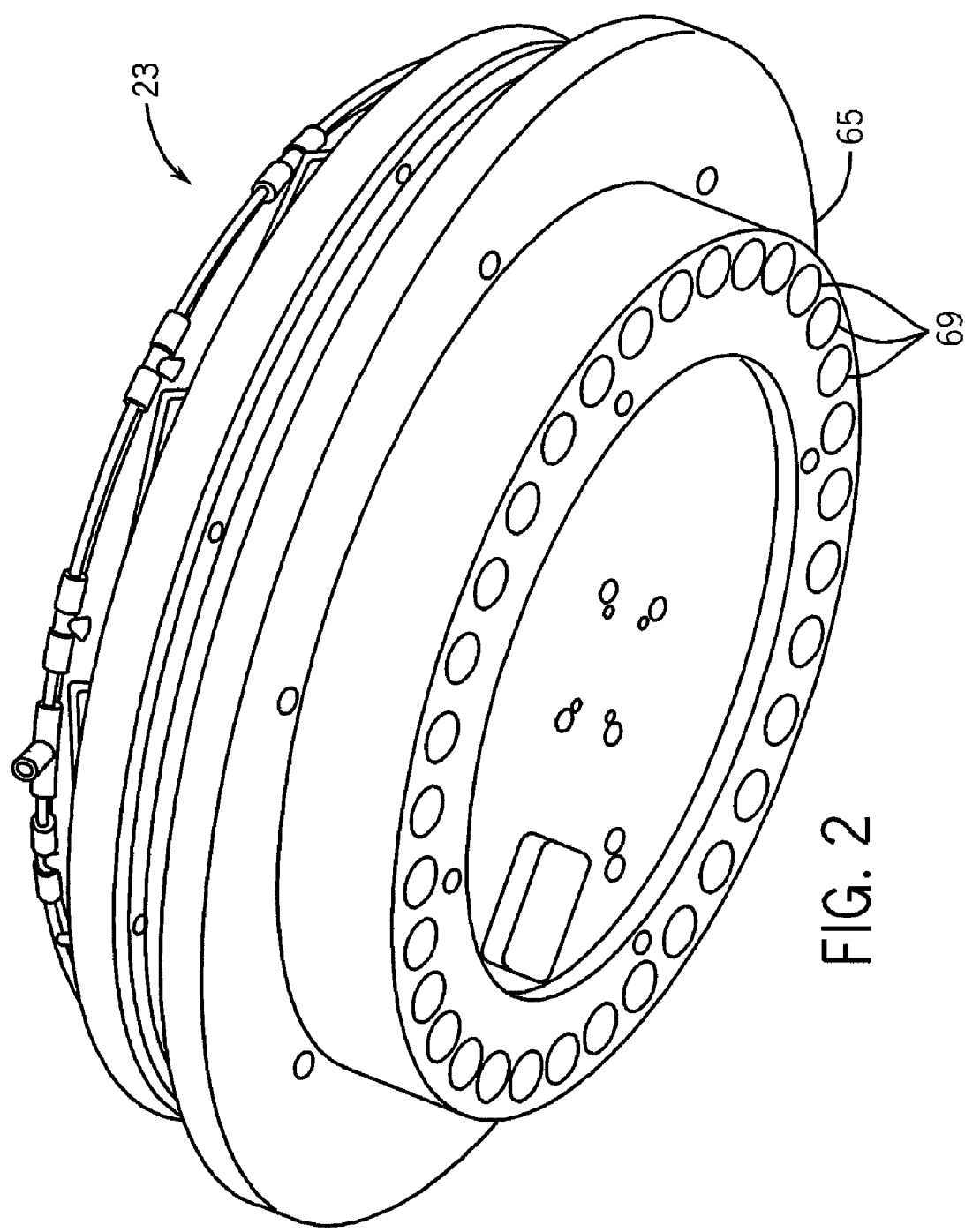
FIG. 2 is a bottom and side perspective view of the pill separation subsystem of the pill dispenser.
Figure 3:
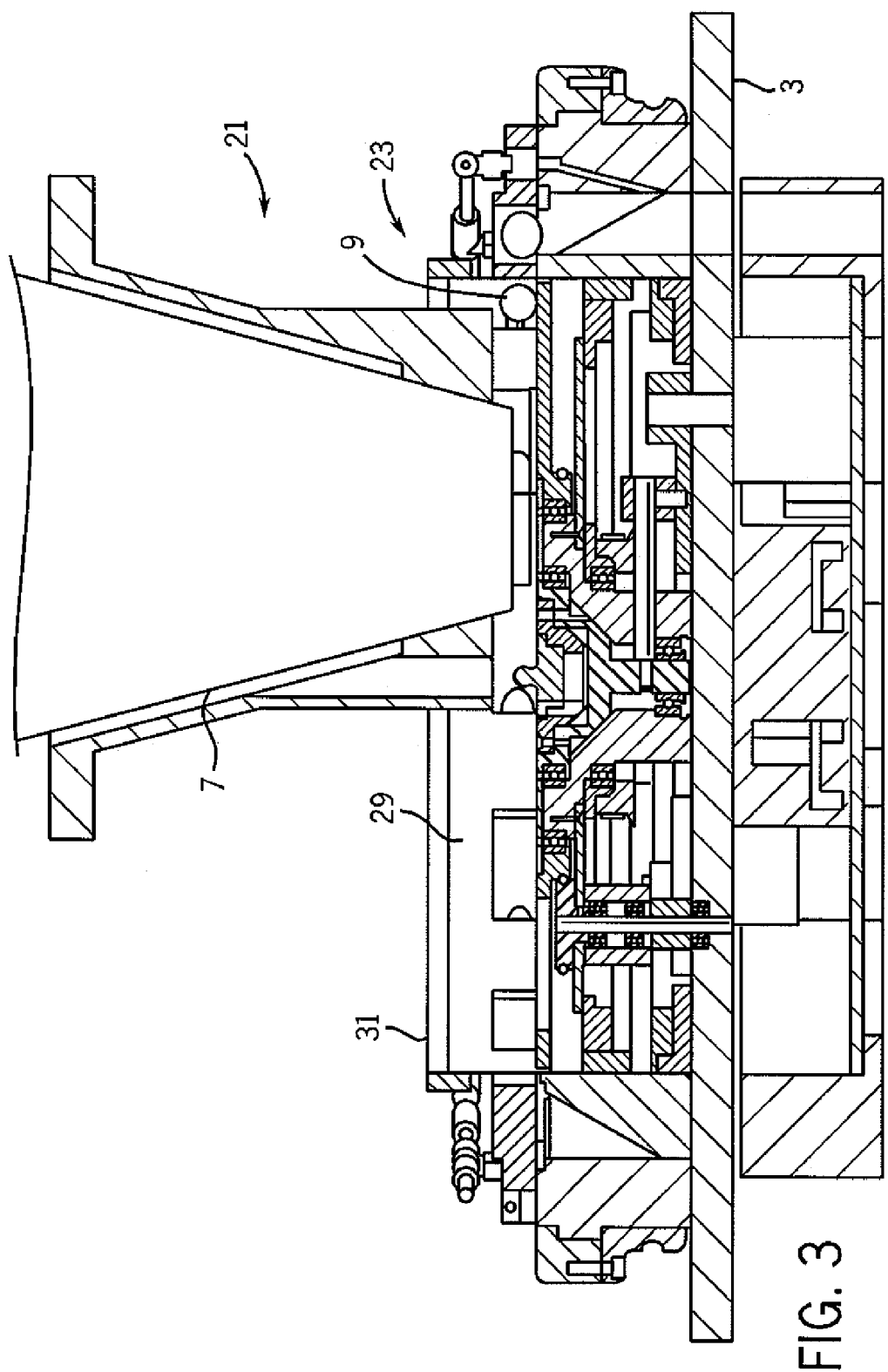
FIG. 3 is a cross-sectional view of the pill separation subsystem and the pill filling subsystem of the pill dispenser
Figure 4:
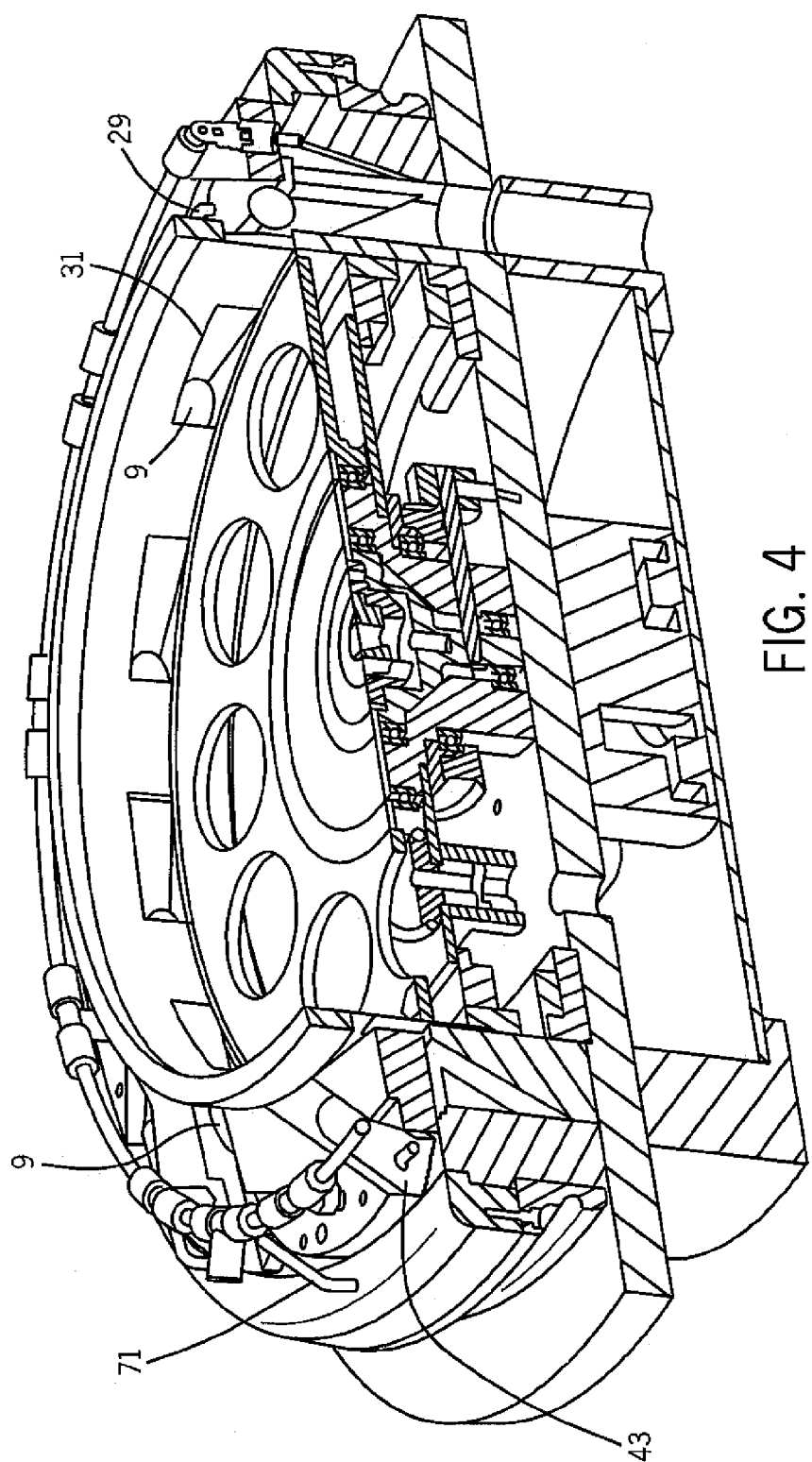
FIG. 4 is a cross-sectional view of the pill separation subsystem of the pill dispenser.
Figure 5:
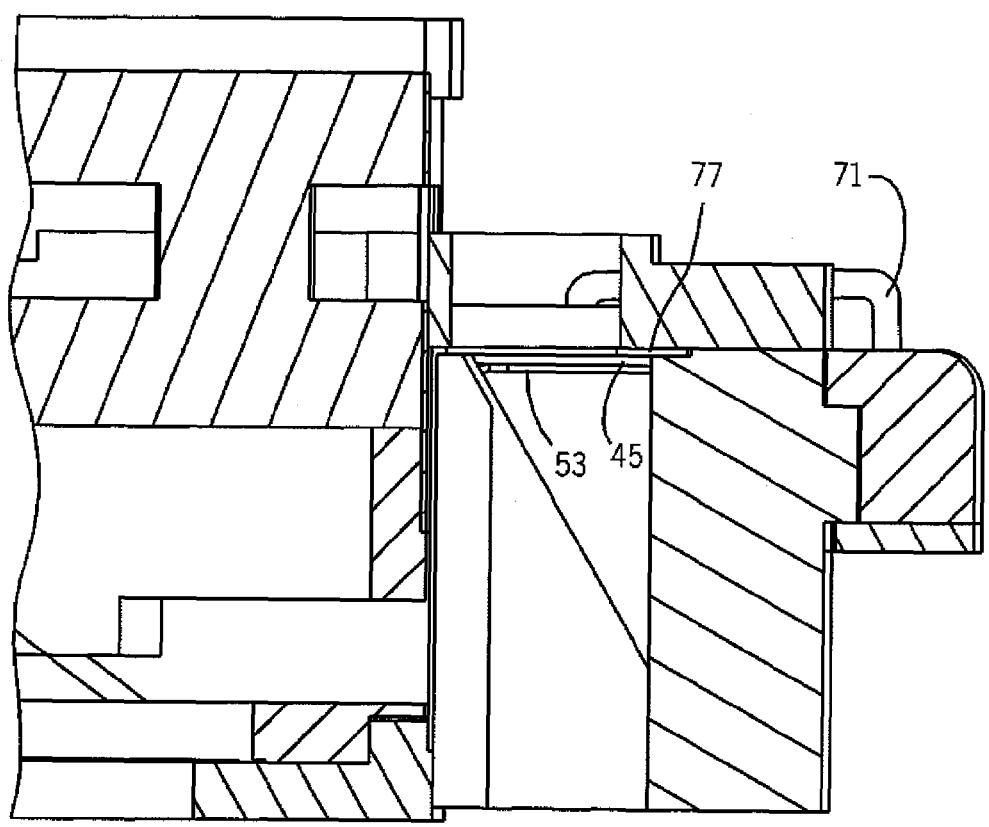
FIG. 5 is an expanded cross-sectional view of the pill separation mechanism.
Figure 6:
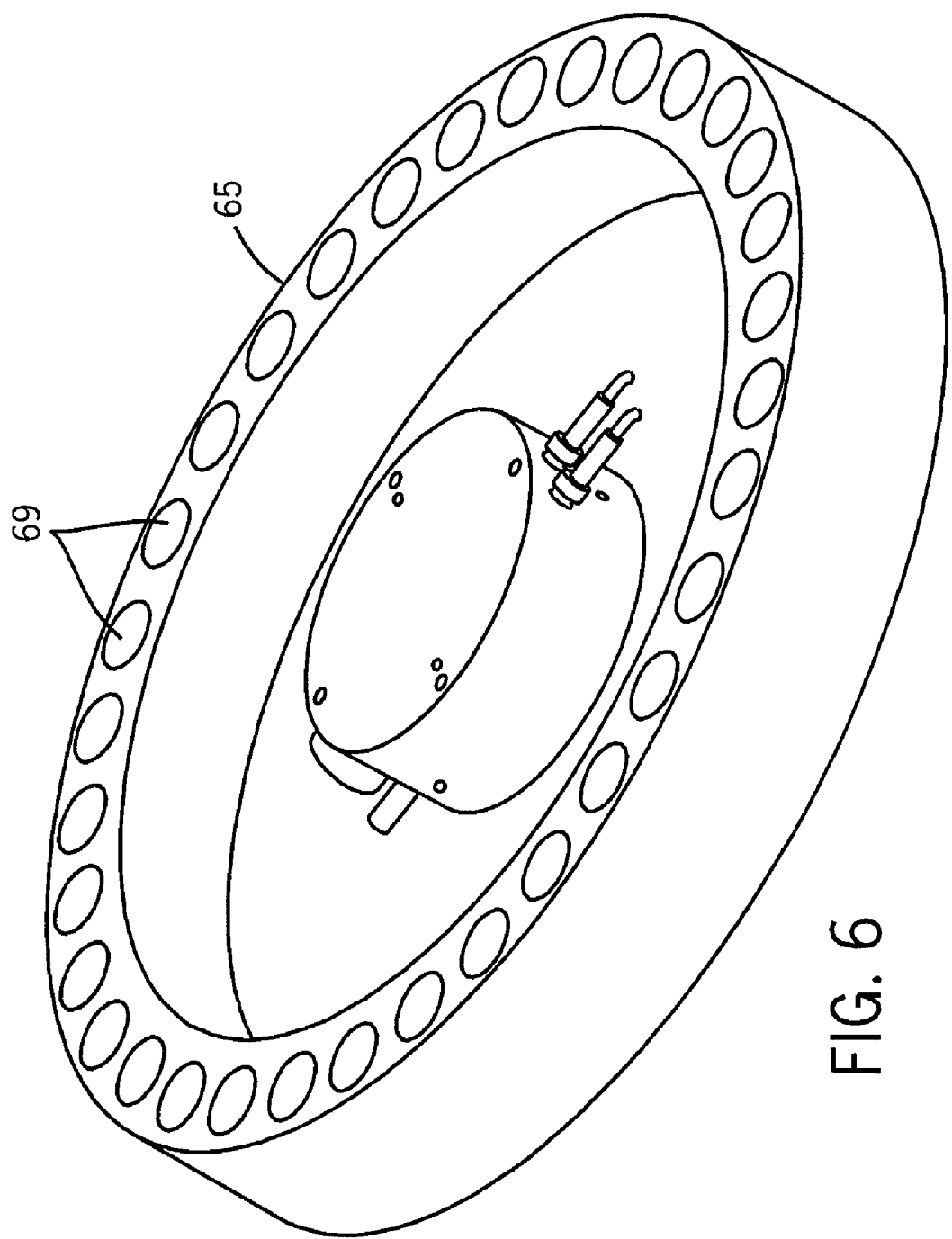
FIG. 6 is a side and bottom view of the indexing disk.
Figure 7:
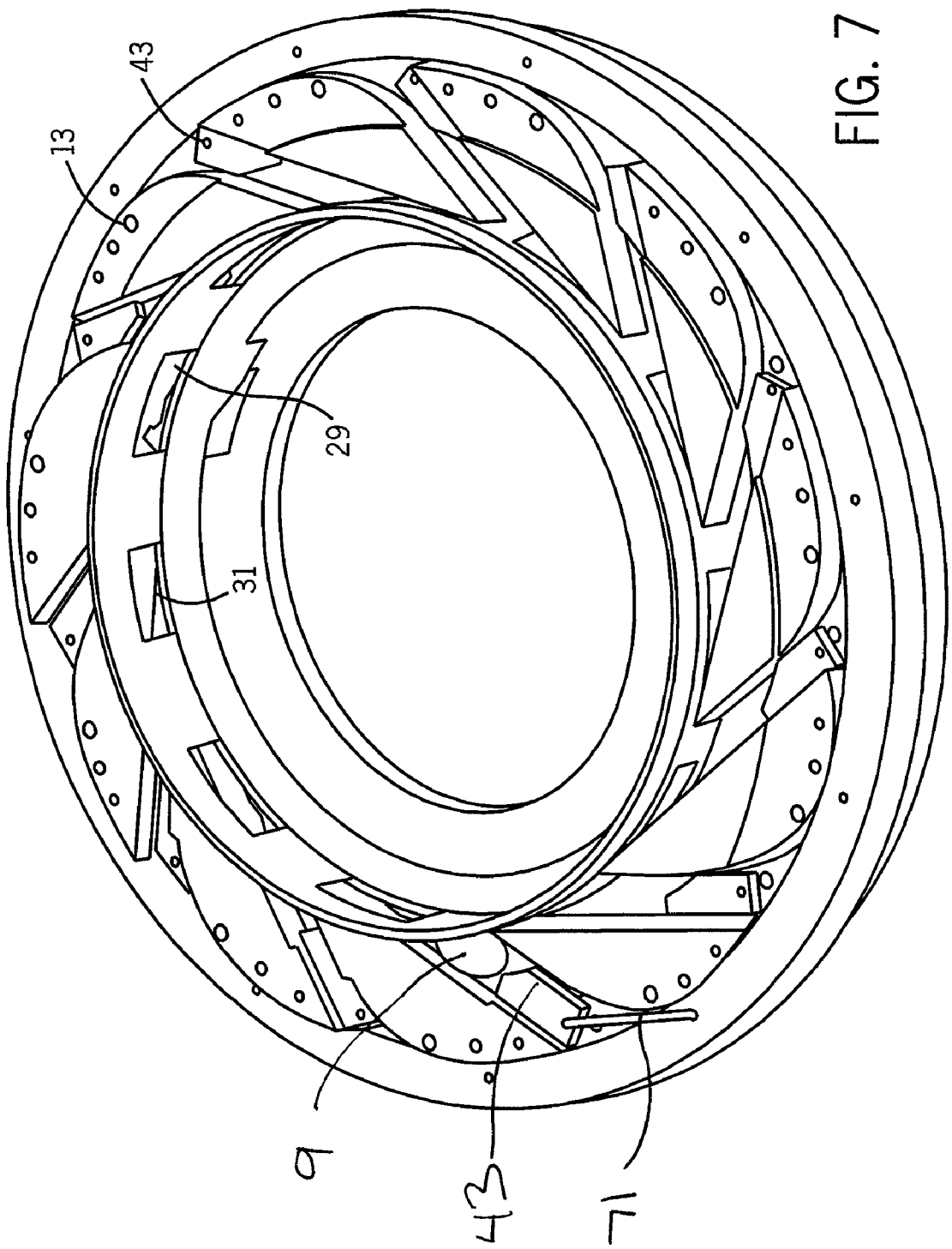
FIG. 7 is a top and side view of the pill separator subsystem having the pill guide slots in the open position.
Figure 8:
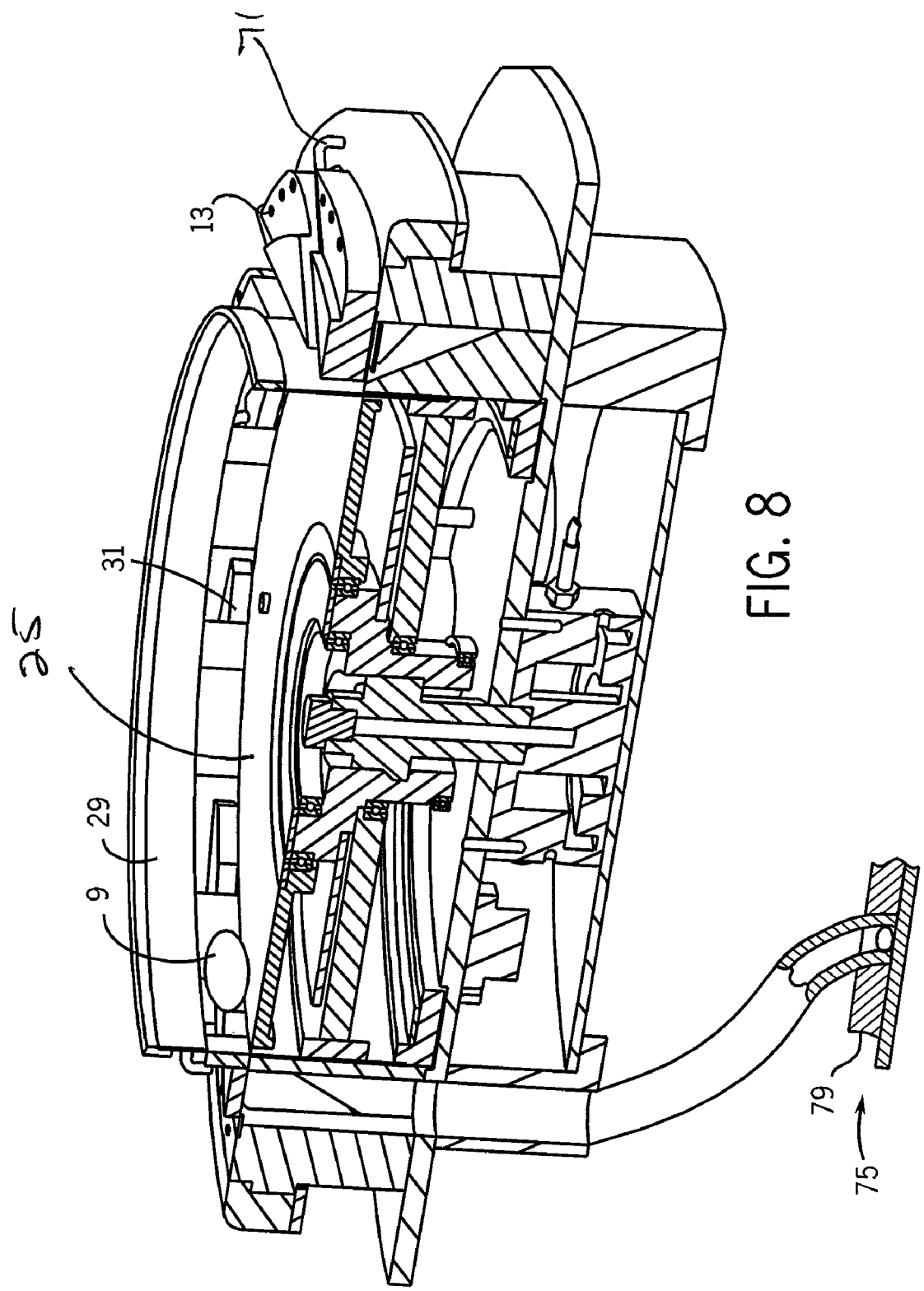
FIG. 8 is a cross-sectional view of the pill separator subsystem showing the pill guide slots in the open position.
Figure 9:
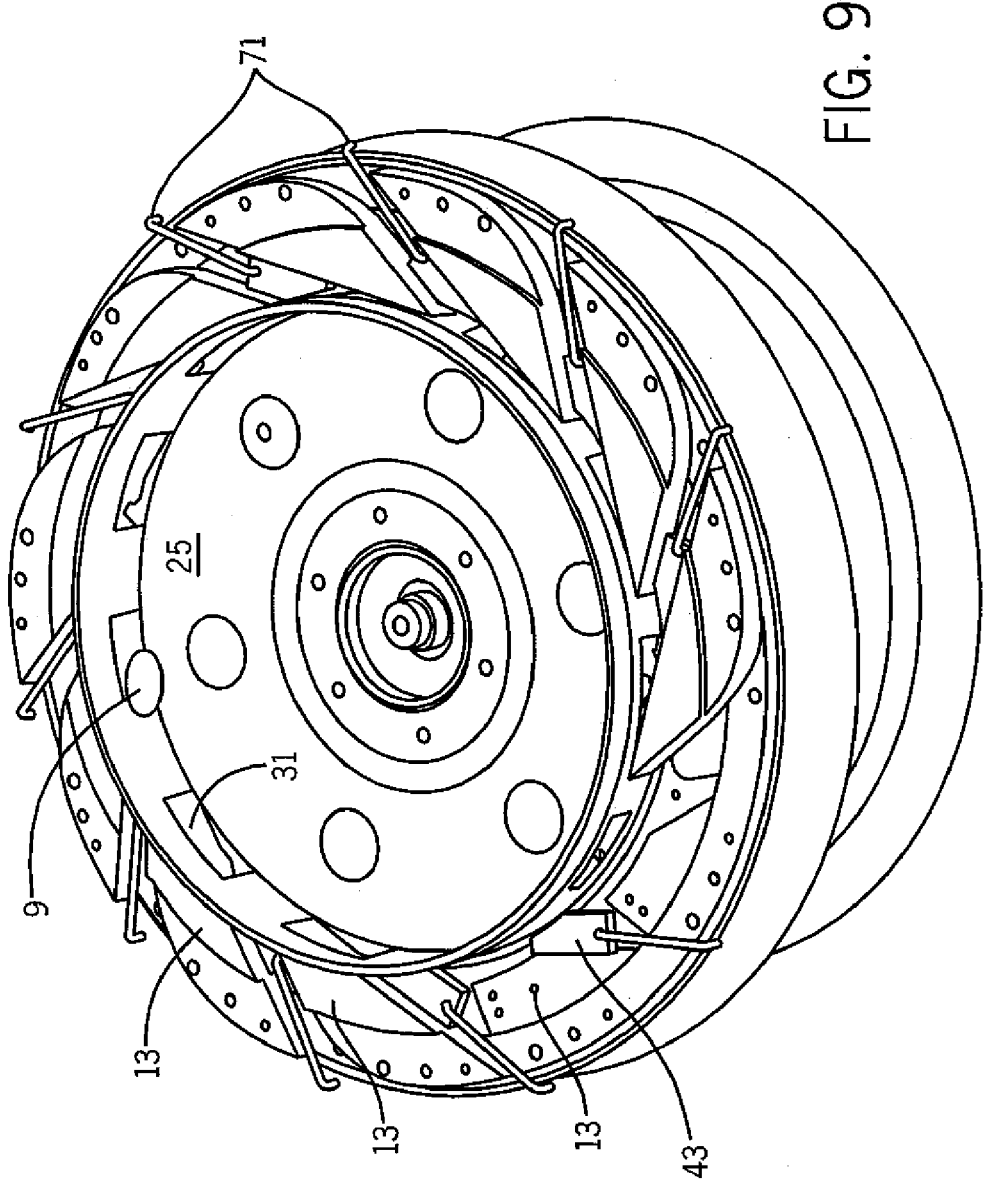
FIG. 9 is a top and side view of the pill separator subsystem having an adjustment finger removed such that pill opening is more visible.
Figure 10:
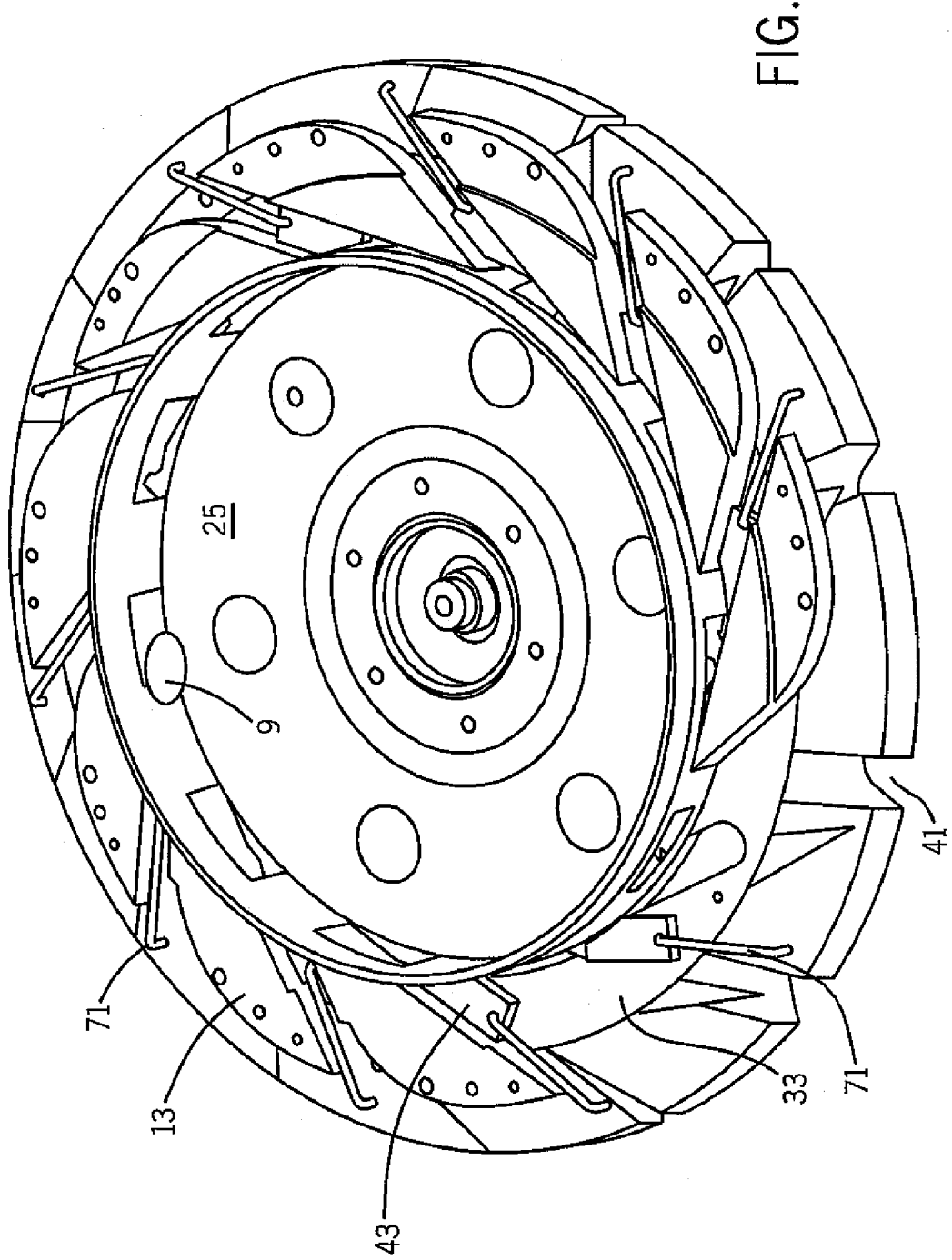
FIG. 10 is a top and side view of the separator subsystem showing the opening through which a pill may fall.
Figure 11:
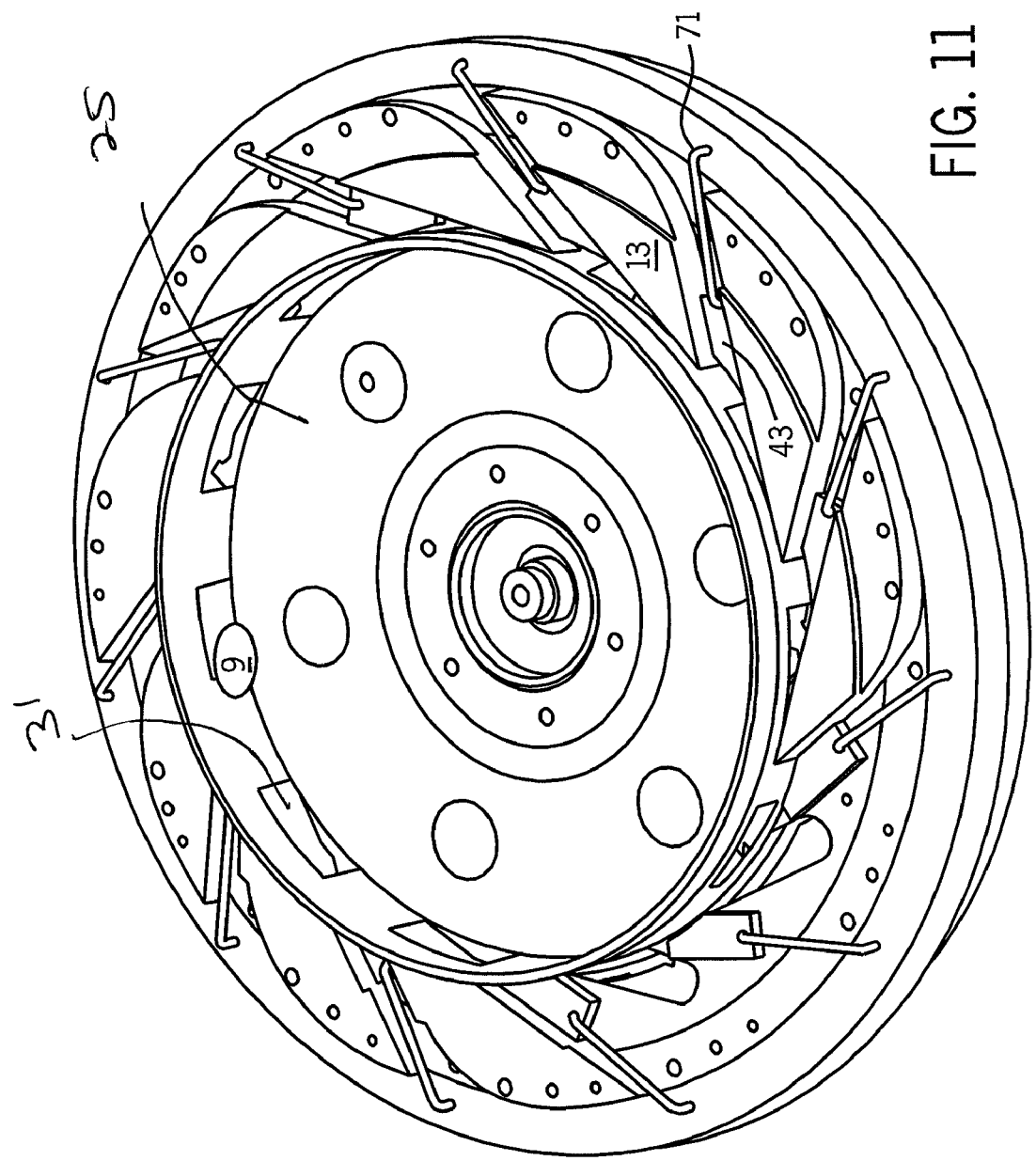
FIG. 11 is a top and side view of the separator subsystem showing the pill guide slots in the open position while the pill drop slots are closed.
Figures 12A, 12B, 12C:
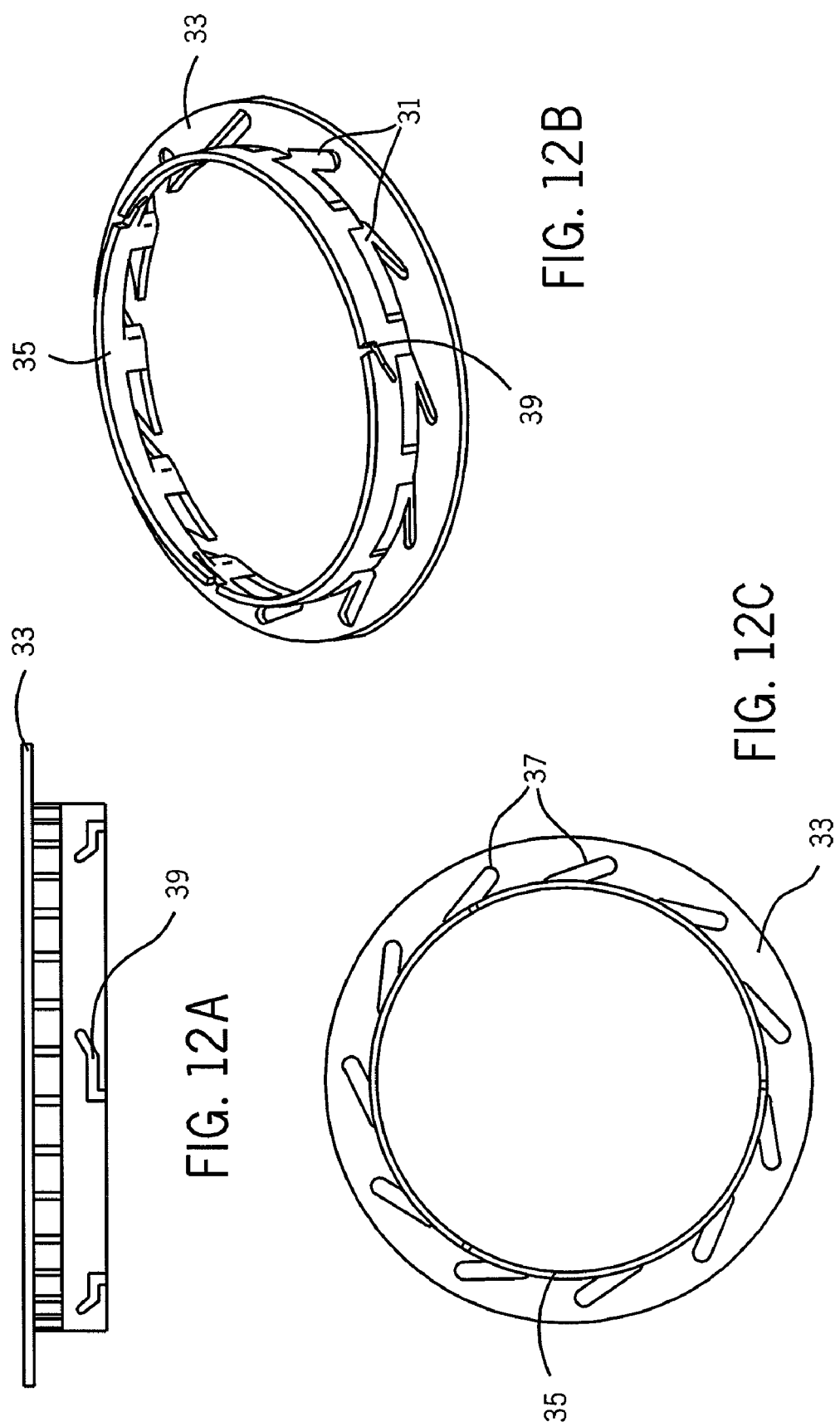
FIG. 12A shows a side view of the separator disk.
FIG. 12B shows as top and side view of the separator disk.
FIG. 12C shows a top view of the separator disk.
Figure 13:
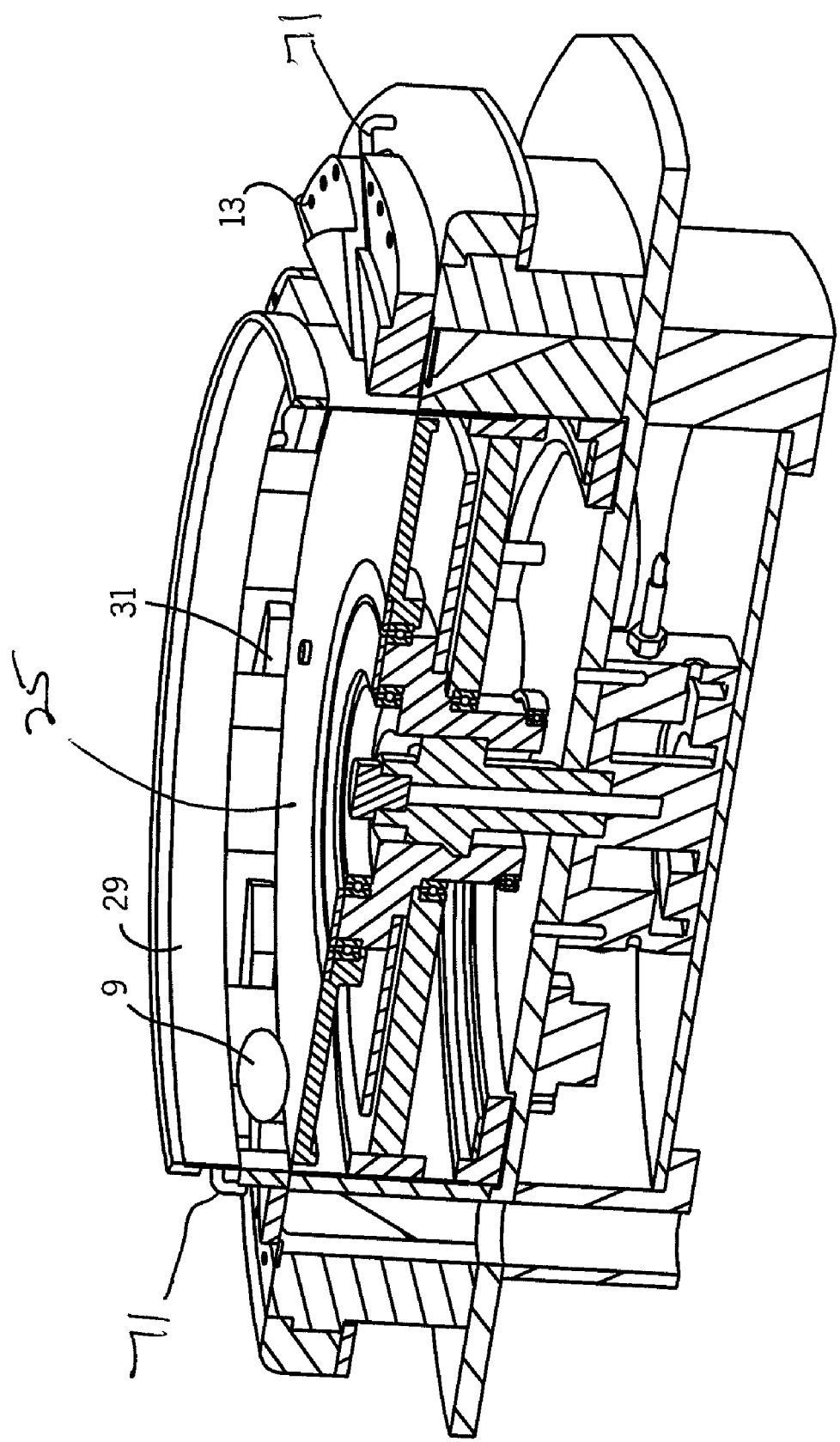
FIG. 13 shows a cross-sectional view of the separator subsystem.

Now referring to the drawings in detail wherein like-numbered elements refer to like elements throughout, FIG. 1 shows one embodiment of the centrifugal pill separator subsystem 23 of the pill dispenser 1 constructed in accordance with the goals of the present invention. In summary, the present invention provides an apparatus for singulating small objects, such as pharmaceuticals, and placing them into blister packs (not shown). In slightly more detail, the present invention provides three subsystems for singulating pills 9. As shown in more detail in FIGS. 3 and 14, the apparatus of the present invention provides for a filling mechanism 21 which is designed to provide a regular flow of pills 9 in a generally single file manner to the second stage from a supply of bulk pills, such as may be in a hopper 7. The second stage, or pill separation stage 23, includes the actual apparatus for singulating pills 9 via a rotating disk 25. The third stage of the present invention provides for delivering the singulated pills 9 to the blister pack and is generally referred to as the distribution mechanism 49.

Figure 14:
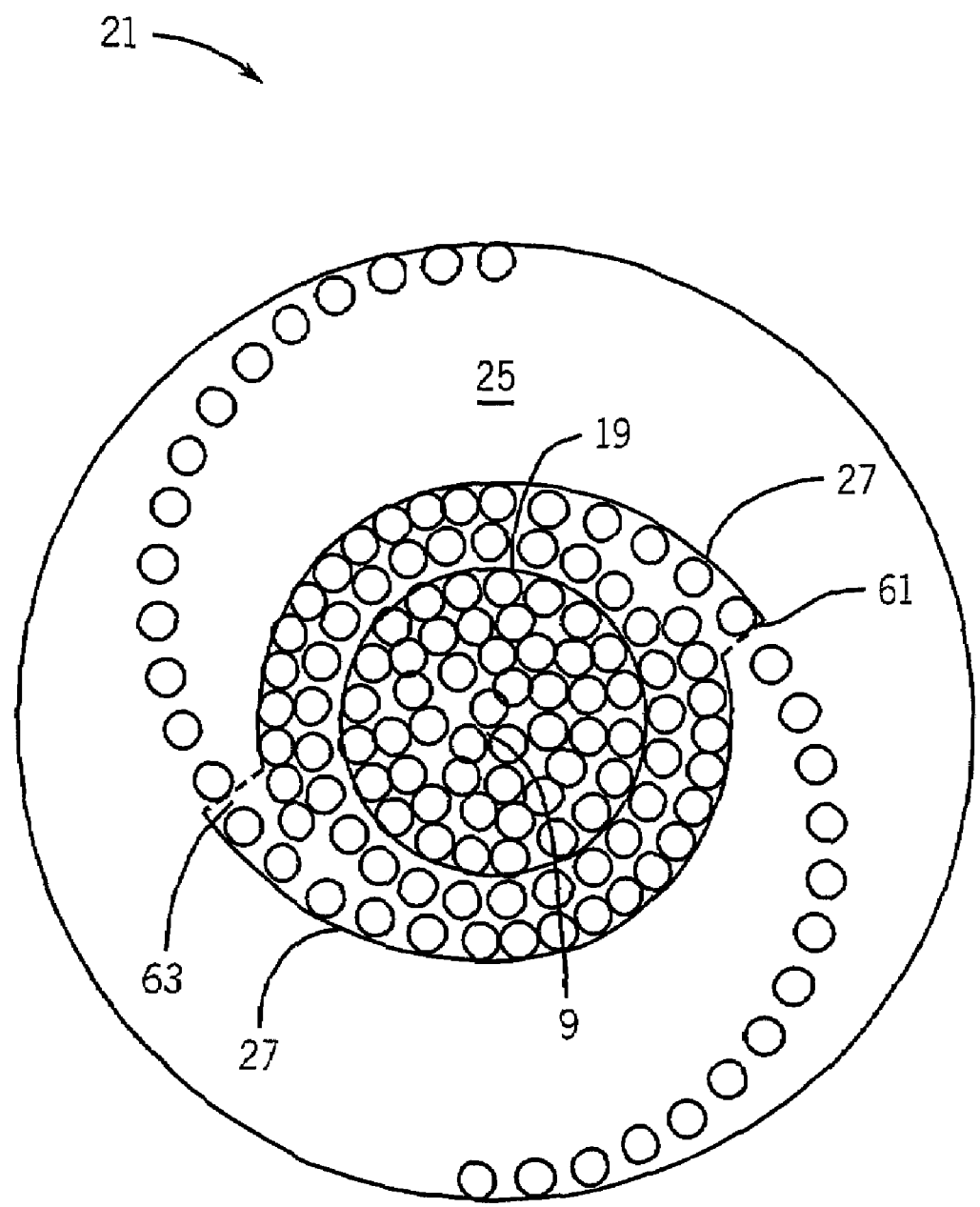
FIG. 14 is a top schematic view of the function of the vanes in the pill filling subsystem.
Figure 15:
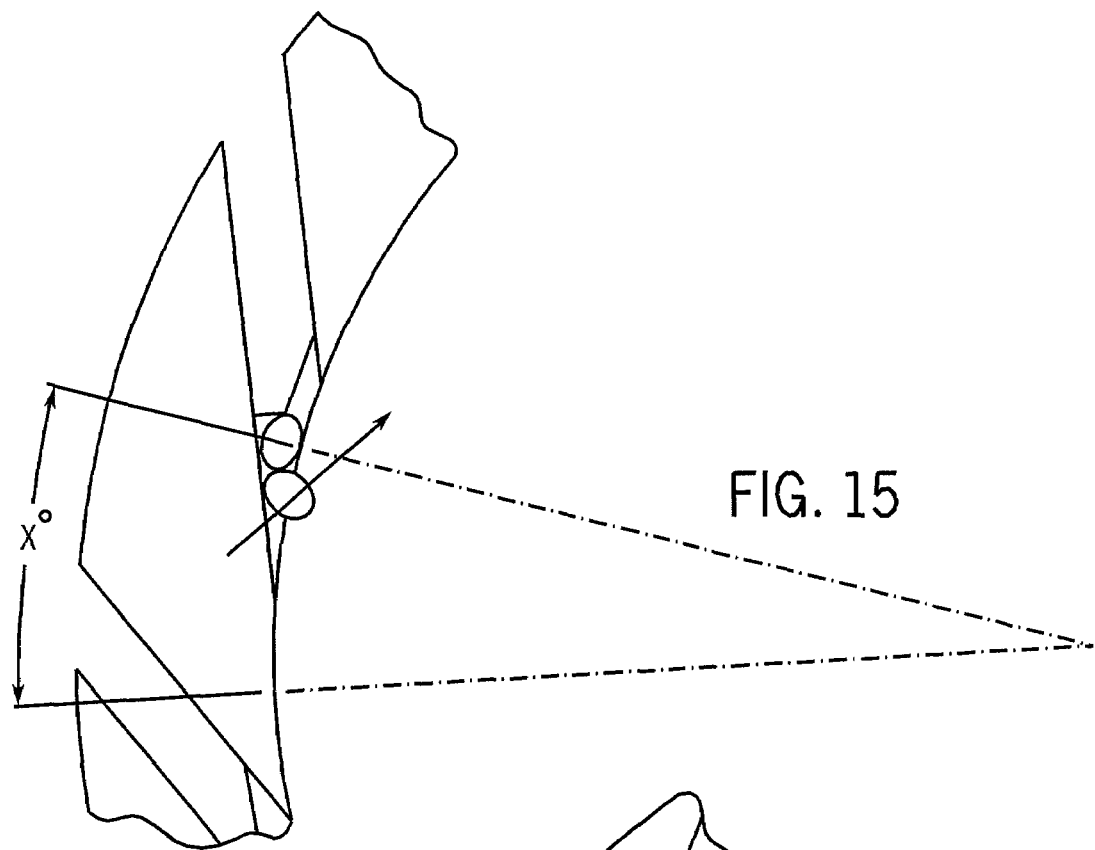
FIG. 15 is a top schematic view of the air flow assist across the rotating disk for excess pill ejection.
Figure 16:
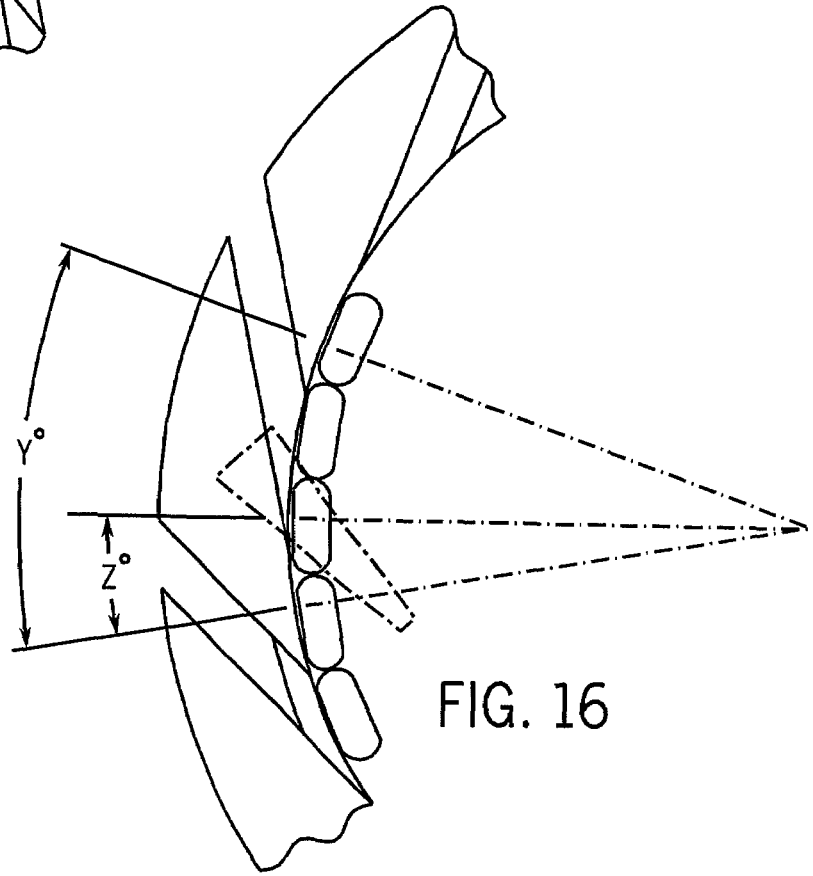
FIG. 16 is a top schematic view of the air flow assist across the rotating disk.

As shown in detail in FIG. 14, the filling mechanism 21 is designed to reduce a mass of bulk pills 9 to an orderly, generally single file line of pills into the separation mechanism 23. The dispensing mechanism provides for a hopper 7 into which bulk pills 9 are conveyed. The hopper 7 can be of nearly any design, the only requirement being that it hold a plurality of pills 9 and have the ability to convey pills 9 to the preliminary dispenser 11 in a controllable fashion. The hopper 7 is used to accumulate pills 9 in-line for the product dispenser 1. The hopper 7 feeds pills 9 to a preliminary dispenser 11. The preliminary dispenser 11, in one embodiment, is generally cylindrical, and positionally, is located over the rotating disk 25. The preliminary dispenser 11 is used to regulate the flow of pills 9 from the hopper 7 to the centrifugal pill separator 23. This is primarily accomplished by providing for a gravity sensor (not shown), the gravity sensor being situated over the top of a pocket 19 into which pills 9 fall. When the pill pocket 19 is full, the gravity sensor is forced upwardly by the volume of pills 9 underneath said gravity sensor. When the pills 9 feed into the separator subsystem 23, the gravity sensor opens further thus assuring a continuous supply of pills 9. While use of a gravity sensor has been discussed, other types of sensors could also be used to determine the level of pills contained within the pill pocket 19. The sensor 19 would then send a first signal to a microprocessor 97 which could then send a second signal back to stop the flow of pills 9 into the pill pocket 19.

The pill pocket 19 of the filling mechanism 21 is also the entry point to the centrifugal separator 23. More specifically, the floor of the pill pocket 19 is a rotating disk 25. As the pocket 19 fills, the centrifugal force of the rotating disk 25 carries the pills 9 outwardly on the disk 25. The rotating disk 25, in one embodiment, could be cone-shaped such that the pills 9 are carried up the slope on the rotating disk 25 to a perimeter of the disk 25. As the pocket 19 fills with pills 9, the pills 9 are guided in a circular path by a flexible vane 27. The flexible vane 27, is generally circular, but is shown having a pair of apertures 61, 63 separated by 180 degrees, although more or fewer openings are possible in the vane 27. The apertures 61, 63 are permitted to open and close. When open, the vane 27 permits pills 9 to exit the pill pocket 19. Generally, the vane 27 opens wide enough such the pills 9 are released in a single file orientation. Additionally, the vane 27 would only remain open long enough to release a fixed amount of pills 9, such as an amount necessary to fill a blister pack, from the flexible vane 27. The opening and closing of the apertures 61, 63 could be controlled by a sensor, or perhaps by a simple timer, such that the amount of pills 9 released is merely estimated. As the pills 9 reach the edge of the disk 25, they circulate to the perimeter of the disk 25. When enough pills 9 are circulating, the flexible vane 27 closes. Additionally, the flexible vane 27 is variably openable. That is, in the case of smaller pills 9, or even elongated pills 9, the vane 27 may only open to permit the passage of a single pill 9, or, in the case of an elongated pill 9, such as a capsule, to only permit passage in a specific orientation.

Surrounding the perimeter of the disk 25 is a separator disk 35. The separator disk 35 has a plurality of apertures 51. The separator disk aperture 51, in general, aligns; with the apertures, or pill guide slots 31, in the separator wall 29 when the separator wall 29 is in the open position and are completely blocked by the separator wall 29 when the separator wall 29 is in the closed position. The separator disk 29 has a flange, or release ring 33, which, if the separator disk 29 is considered to be vertical, the release ring 33 is considered generally at 90 degrees from said separator wall 29. The separator disk 29 additionally has a cam slot 39 which, when the separator disk 29 is rotated, lifts the separator disk 29 thus exposing the pill guide slots 31 and aligning them with the apertures 51 of the separator disk 35. The pill guide slots 31 are in the separator disk 29 and serve to guide the entry of the pills 9 such that the pills 9 enter the pill guide slots 31 located physically over the pill drop slots 37, which may be considered to be located in the release ring, or flange 33. The pill guide slots 31 are located between the guides 13. The guides 13 are situated on or at an angle to the rotating disk 25, preferably at an angle tangent to the rotating disk 25 such that the pills 9 enter the pill drop slots 31 created by the guides 13 in the most expeditious manner. The guides 13 are shown accommodating a specific size pill 9. The guides 13 could be narrower so as to create wider pill drop slots 31 and thus to accommodate larger pills 9. Similarly, the guides 13 could potentially be wider and create narrower pill drop slots 31 which would aid in pill 9 singulation in the event smaller pills are required to be singulated.

As discussed above, the release ring 33 is located circumferentially outside of the pill guide slots 31, and, in general, the pills 9 will be resting on the release ring 33 after they are singulated into the pill drop slots 31. The release ring 33 has a plurality of apertures, or pill drop slots 37, the drop slots 37 permitting passage of a pill 9 through the drop slots 37 in the release ring 33 after the separator wall 29 has opened and permitted entry of a pill 9. The pill drop slots 37 in the release ring 33 provide entry for the pills 9 to the indexing disk 65.

The pills 9 then pass through the distribution mechanism, which can be understood as consisting of three disks. Initially, there is the stop ring 45, then the dispensing ring 53, and lastly the indexing disk 65. The stop ring 45 is used to block any or all of the plurality of pills 9 in the pill drop slots 31 from dropping into the indexing disk. The stop ring 45 may be especially important in filling a blister pack with pills 9 when the blister pack has a number of blisters that is not a multiple of the number of pill drop slots 31. Immediately below the stop ring is a guide chute 73 for controlling the drop of a pill 9 through the channels 41 in the dispensing ring 53. The guide chute 73 and dispensing ring 53 align the pills as they travel to the indexing disk 65. The dispensing ring 53 may include a pressured air assist to ensure that pills drop uniformly through the channels 41.

The indexing disk 65 has a plurality of apertures 69, generally corresponding to a multiple of the number of pill guide slots 31 and separator disk apertures 51. Therefore, as the disk 25 rotates, the pill guide slots 31 begin to fill with pills 9. When the guide slots 31 each contain a pill 9, the separator wall 29 rotates following the cam slot 39 and cam 67, thus closing the pill guide slots 31 and exposing the pill drop slots 37 and permitting the pills 9 to drop into the apertures 69 of the indexing disk 65. The indexing disk 65 is then triggered by the microprocessor 97 to index one time such that each pill drop slot 37 corresponds to a new aperture 69 in the indexing disk 65. The base of the indexing disk 69 is covered by a shuttle plate 75, said shuttle plate releasing all the pills 9 simultaneously through tubes 77 to a blister pack. The shuttle plate 75 may also release the pills 9 to a lower holding plate 79, or yet another shuttle plate, whereupon they enter the blister pack.

As previously discussed, there exists a wide variety of pill 9 sizes, shapes and types. Therefore, the present invention provides for a plurality of adjustable features, in addition to the aforementioned, including differently sized guides 13.

Additionally, the bar code information can include adjustment as to the depth in the pill guide slot 31 of the adjustment fingers 43. The adjustment fingers 43 are preset to an appropriate depth depending on the size and shape of the pill 9. The adjustment fingers 43 are adjustable using the combination of a stepper motor (not shown) and a linkage arm 71 connecting the stepper motor and the adjustment fingers 41.

Obviously, the frictional relationship between the rotating disk 25, the pills 9 and the separator wall 29 is very important to the operation of the apparatus of the invention. For example, if friction from the separator wall 29 is too high, pills 9 may tumble along the separator wall 29 as opposed to sliding along the separator wall 29. Pill 9 tumbling action reduces the likelihood that the pills 9 will enter the pill guide slots 31, thus increasing the amount of time it takes to fill the pill guide slots 31 along the separator ring 29.

Conversely, the friction between the rotating disk 25 and the pill 9 must be greater then the friction between the separator wall 29 and the pills 9, or the pills would not move along the separator wall 29 at all. Also, the centrifugal force on the pill 9 due to rotation should be greater than the frictional force stopping the pill 9 from moving outwardly on the rotating disk 25.

Very small pills 9 may still present an obstacle to be overcome by the method and apparatus of the present invention as described above. In that case, the present invention also provides for the use of an air assist to push the pills 9 into the pill guide slots 31. In such cases, the air stream could be fanned out over the rotating disk 25 so as to provide an outward stream of air across the entire rotating disk 25 or streams of air could be aimed at each individual pill drop slot 31.

Singulating pills 9 within the pill drop slot 31 is also very important to prevent instances of multiple pills resulting in a blister pack. Therefore, the present invention provides for an optional air assist after a pill 9 has entered the pill drop slot 31, but before the separator wall 29 has closed, thereby sealing off the pill drop slot 31. In effect, the air stream is used to move the pill 9, or any additional pills behind the pill 9 in the pill guide slot 31, such that any additional pills do not interfere with the closing of the separator wall 29.

An onboard computer or Programmable Logic Controller (PLC) controls the speed and direction in which the disk 25 spins. The disk size and speed are dependent on the size, weight, surface texture and coefficient of friction between the pill to be filled and the package size being processed. The pill dispenser is electromechanically connected with both the packaging machinery downstream and a computer to provide means for tailoring the pill dispenser to a specific application.

FIG. 17 shows a detailed assembly drawing of one embodiment of the present invention showing the cam height adjustment 93 in combination with the height adjustment ring 91 which cooperate to adjust the height of the window opening the pills are directed into. Also shown is the nest subassembly 95 which provides a place to "catch" the pill. The width of the opening for the pill in the eight nest subassembly 95 is determined by the window ring weldment 97.

FIG. 17 also shows the release ring 99 which rotates to permit the pills to drop through the chutes 101 in the chute support ring 103. Additionally, FIG. 17 shows the pocket subassembly 105 in combination with the pill dispenser 1. The pocket subassembly 107 is comprised of the eight pocket retainer shown in FIG. 18 and the eight pocket nest shown in FIG. 19.

Figure 18:
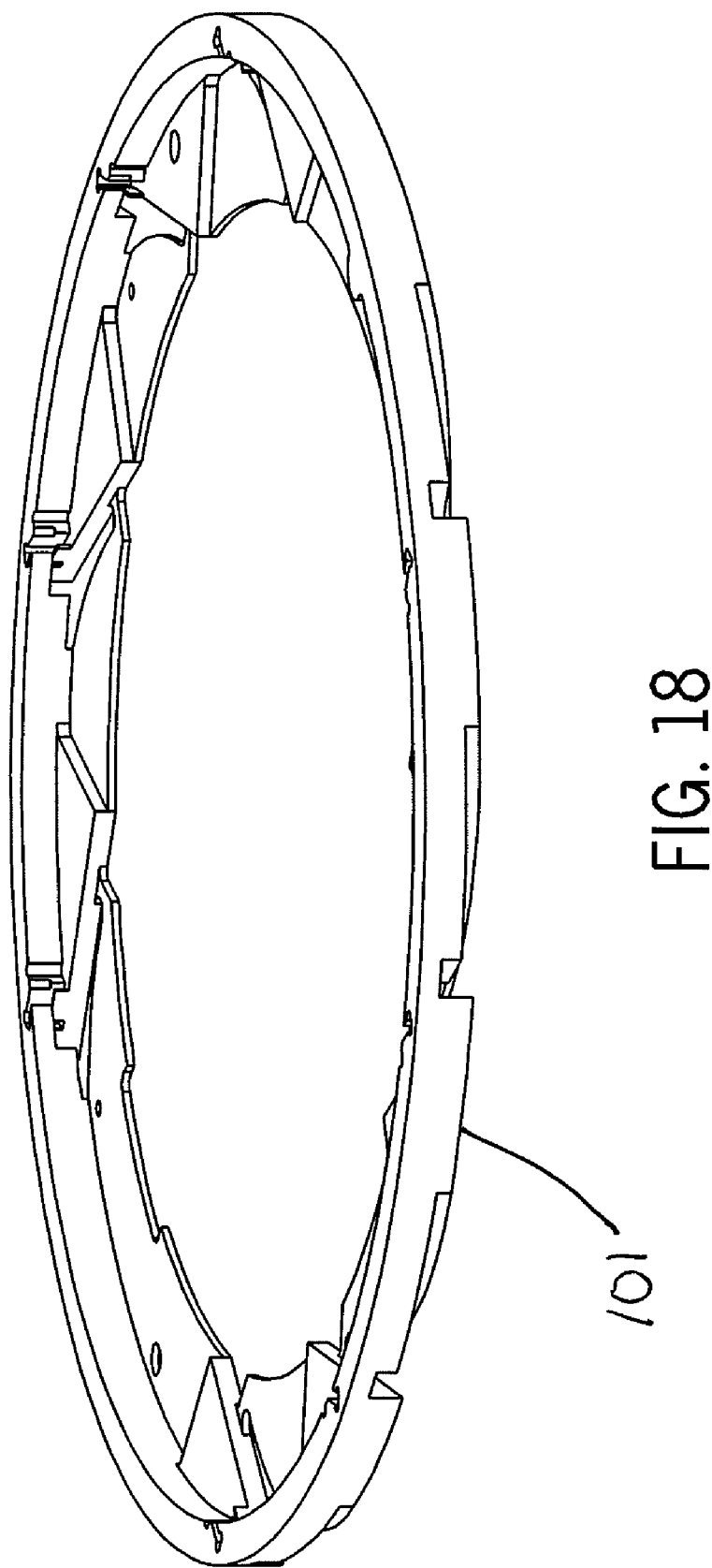
FIG. 18 is a top and side perspective view of the retaining ring of the pill dispensing mechanism.
Figure 19:
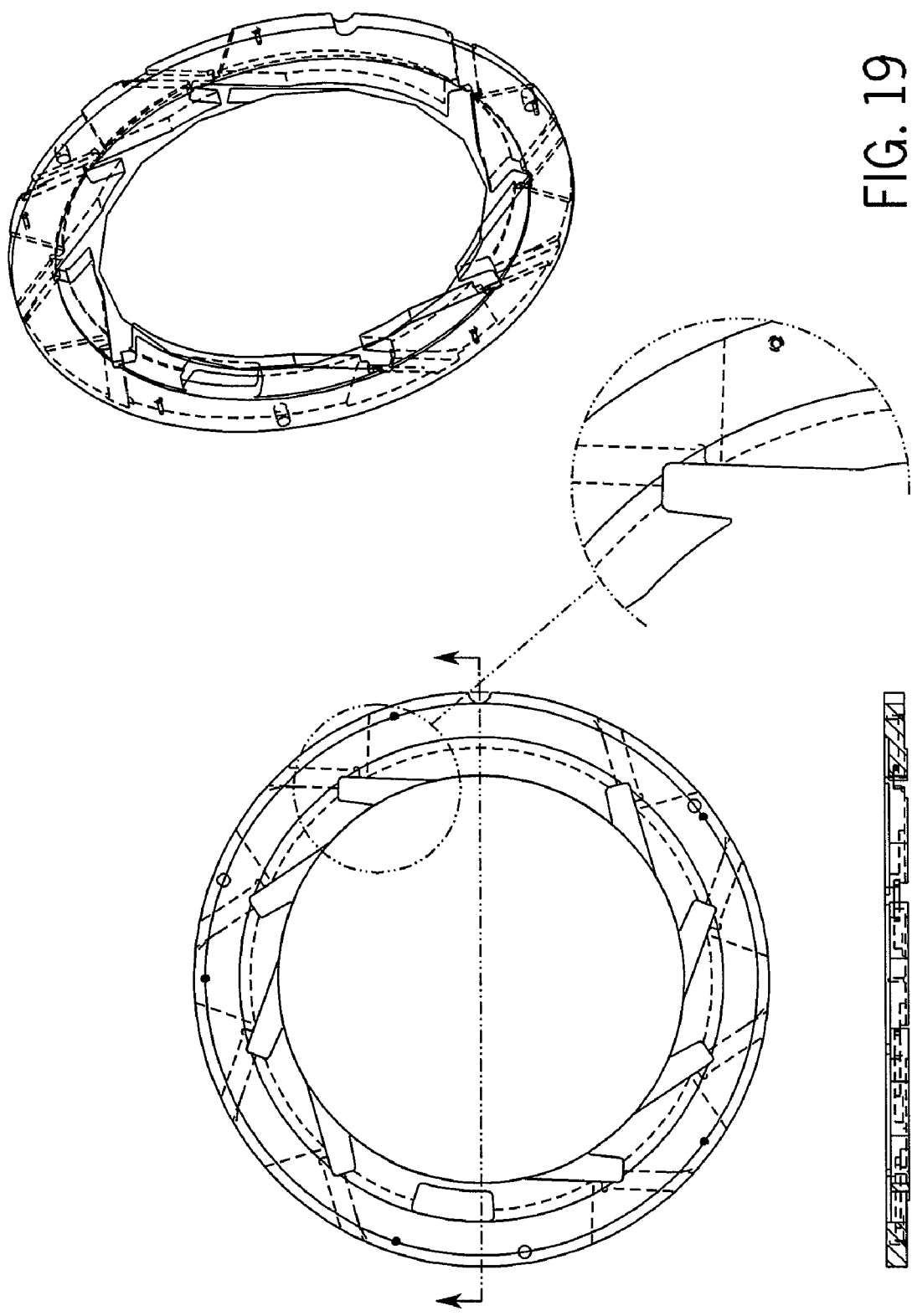
FIG. 19 is top and side view of the nesting ring employed in the pill dispensing machine.
Figure 20:
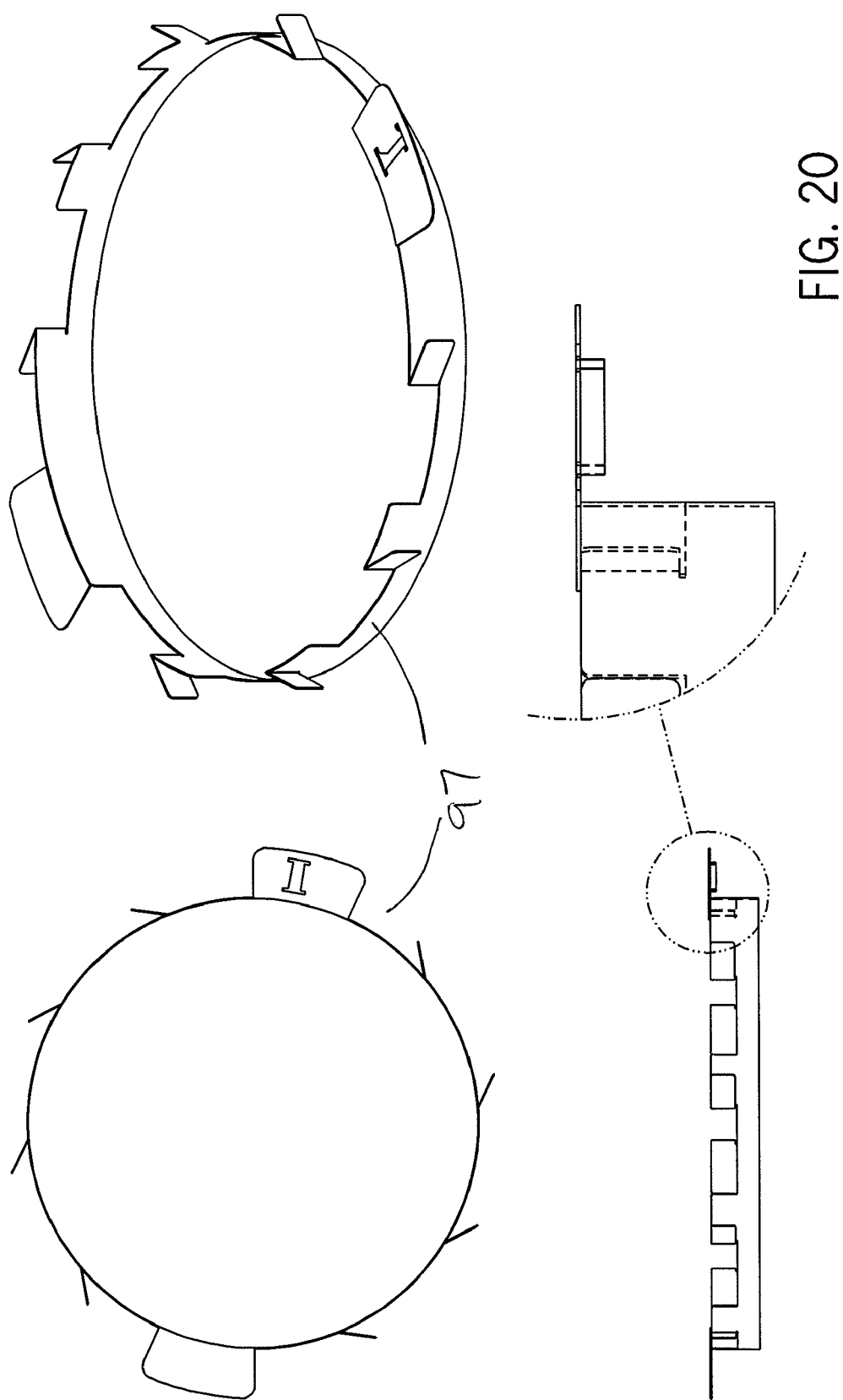
FIG. 20 is a top view of the window adjustment ring weldment.

FIG. 17 shows the window adjustment ring weldment which rotates to accommodate differently sized pills. FIG. 18 shows the chute weldment 109, with the chute support ring 111 and the chute 113 through which the pills 9 drop after entering the through the window. The pills 9 then drops into the indexing disk 65.

In summary, the present invention provides a method and apparatus for filling a blister pack comprising the steps of: scanning a product bar code; adjusting the pill dispenser to meet the size and shape requirements of the product to be filled; permitting the passage of pills into the hopper 7; releasing product to the separator; centrifugally spinning the product to a plurality of gates; permitting the product to drop into the blister of a blister pack.

Additionally, the present invention provides an apparatus for conveying pills in an orderly fashion to a rotating disk; capturing said pills in gates from the rotating disk and permitting the pills to drop into a blister pack.

What is claimed is:

1. An apparatus for singulating small, regularly shaped objects comprising:
    a rotating disk;
    a separator disk, the separator disk having a separator wall surrounding the rotating disk and at approximately right angles to the rotating disk, the separator wall having a plurality of pill guide slots defined therein and a cam slot, the separator disk further having a flange approximately at a right angle to the separator wall; the flange having a plurality of pill drop slots defined therein;
    a plurality of guides located above the flange, the size of the guides being adjustable so as to vary the width of the pill guide slots; and
    a plurality of depth adjustment fingers, the depth adjustment fingers being located between the guides and being adjustable to vary the depth of the pill drop slot.

2. The apparatus of claim 1 further providing an indexing disk having a plurality of apertures below the pill drop slots.

3. The apparatus of claim 2 wherein the separator disk is permitted to rotate upwardly on the cam to close the pill guide slots and open the pill drop slots.

4. The apparatus of claim 3 further comprising a stop ring having a plurality of apertures interposed between the flange of the separarator disk and the indexing disk, the stop ring being operable to block the entry of a pill or more than one pill into the indexing disk.

5. The apparatus of claim 1 further comprising a filling mechanism for feeding the objects to the rotating disk comprising a hopper, the hopper further comprising plurality of guide vanes, the guide vanes aiding in distributing the objects in a single-file across the rotating disk.

6. An apparatus for singulating pills comprising:
    a rotating disk
    a filling mechanism for feeding the objects to the rotating disk comprising a hopper, the hopper further comprising a plurality of guide vanes, the guide vanes aiding in distributing the objects in a single-file across the rotating disk;
    a separator disk, the separator disk having a separator wall surrounding the rotating disk and at approximately right angles to the rotating disk, the separator wall having a plurality of pill guide slots defined therein and a cam slot, the separator disk further having a flange at approximately right angles to the separator wall; the flange having a plurality of pill drop slots defined therein;
    a plurality of guides located above the flange, the size of the guides being adjustable so as to vary the width of the pill guide slots; and
    a plurality of depth adjustment fingers, the depth adjustment fingers being located between the guides and being adjustable to vary the depth of the pill drop slot.

7. The apparatus of claim 6 further providing an indexing disk having a plurality of apertures below the pill drop slots.

8. The apparatus of claim 7 wherein the separator disk is permitted to rotate upwardly on the cam to close the pill guide slots and open the pill drop slots.

9. The apparatus of claim 8 further comprising a stop having a plurality of apertures interposed between the flange of the separator disk and the indexing disk, the stop ring being operable to block entry of a pill or more than one pill.

10. A method for singulating objects comprising the steps of:
    providing a rotating disk;
    surrounding the rotating disk with a separator disk; the separator disk having a separator wall surrounding the rotating disk and at approximately right angles to the rotating disk, the separator wall having a plurality of pill guide slots defined therein and a cam slot, the separator disk further having a at flange approximately right angles to the separator wall; the flange having a plurality of pill drop slots defined therein;
    providing a plurality of guides located above the flange,
    permitting the size of the guides to be adjustable so as to vary the width of the pill guide slots; and
    providing a plurality of depth adjustment fingers;
    permitting the depth adjustment fingers to be adjustable to vary the depth of the pill drop slot;
    placing objects on the rotating disk;
    waiting until the objects slide to the edges of the rotating disk into the apertures; and closing the apertures in the separator.

11. The method for singulating objects of claim 10 further comprising the step of detecting whether the apertures in the separator contain a pill.

* * * * *